Dec. 31, 1957  F. D. JONES  2,818,072
ROTATING CYLINDRICAL HUSKING MECHANISM
Filed Dec. 22, 1955  2 Sheets-Sheet 1

INVENTOR.
FRANK D. JONES

ATTORNEYS

Dec. 31, 1957   F. D. JONES   2,818,072
ROTATING CYLINDRICAL HUSKING MECHANISM
Filed Dec. 22, 1955   2 Sheets-Sheet 2
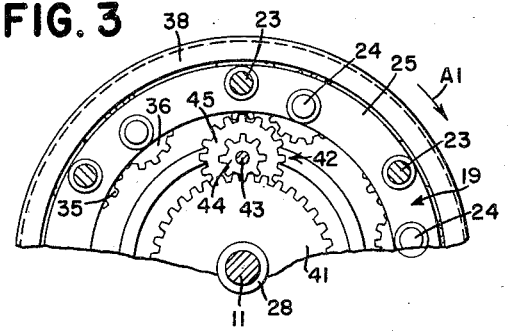
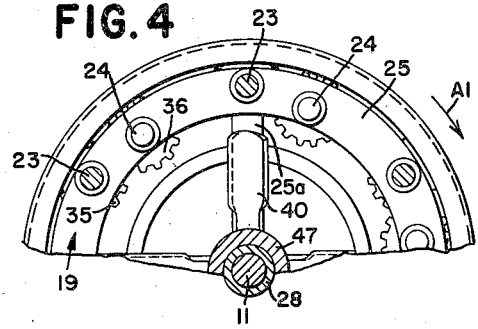
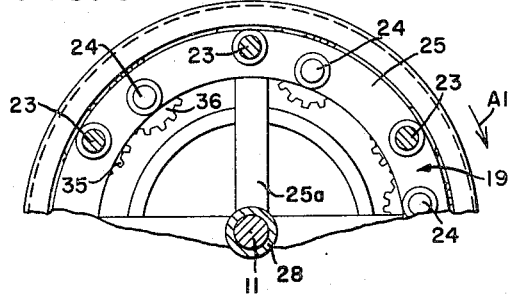
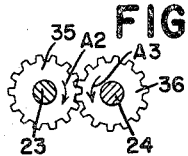
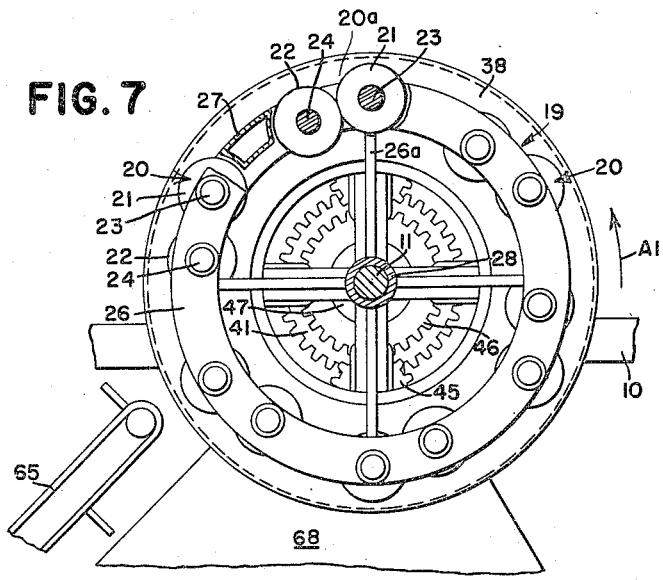
INVENTOR.
FRANK D. JONES
ATTORNEYS United States Patent Office 2,818,072
Patented Dec. 31, 1957

2,818,072

ROTATING CYLINDRICAL HUSKING MECHANISM

Frank D. Jones, Moline, Ill., assignor to Deere & Company, Moline, Ill., a corporation of Illinois Application December 22, 1955, Serial No. 554,816

15 Claims. (Cl. 130—5)

This invention relates to a corn husking mechanism of the type which may be operated in conjunction with or as a part of a corn harvester or which may be operated as a separate unit.

The object of the invention is to provide a new and novel method of husking corn which incorporates the use of a rotatable cylindrical structure composed of a plurality of angularly spaced pairs of husking rolls mounted on a suitable framework and is provided with suitable drive means which serves not only to rotate the structure as a unit about a horizontal axis, but also includes means for driving the individual husking rolls. Unhusked ears of corn are fed to the outer perimeter of the cylindrical structure where the husking rolls cause the husks to be removed from the ears and to be driven inwardly to the center of the cylindrical structure.

It is also an object of this invention to incorporate with the above type of husking mechanism a blower which will operate to direct a blast of air axially relative to the cylindrical structure and to drive the husks in the center of the structure out one end thereof.

It is also an object of this invention to provide with the above type husking unit a husking shoe which will maintain the ears of corn adjacent to the husking structure and which is adjustable to vary the pressure of the shoe against the ears of corn.

It is still a further object of this invention to provide in the above husking system a single drive mechanism which will rotate the cylindrical structure as a unit while at the same time rotating the husking rolls individually and which will further rotate the fan of the blower means.

Other objects and advantages of the invention will become apparent to those skilled in the art as the nature of the invention is better understood in the disclosure of the invention as given in the following specification and its accompanying drawings.

Fig. 3 is a sectional view taken along the lines 3—3 of Fig. 2.

Fig. 4 is a sectional view taken along the lines 4—4 of Fig. 2.

Fig. 5 is a sectional view taken along the lines 5—5 of Fig. 2.

Fig. 6 is a sectional view taken along the lines 6—6 of Fig. 2.

Fig. 7 is a sectional view taken along the lines 7—7 of Fig. 2.

Figure 1:
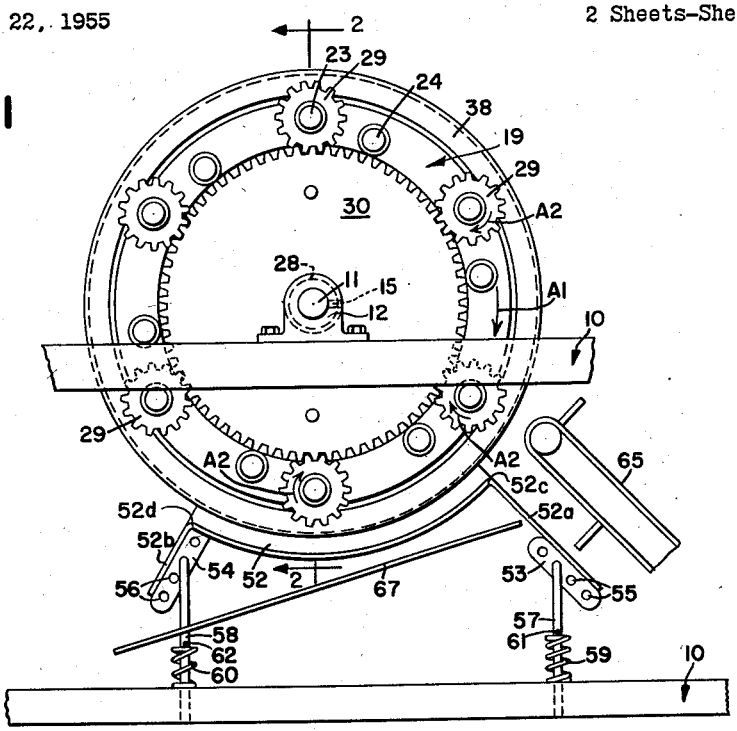
Fig. 1 is an end view of the husking unit with portions of the frame and the ear feeding means also shown.
Figure 2:
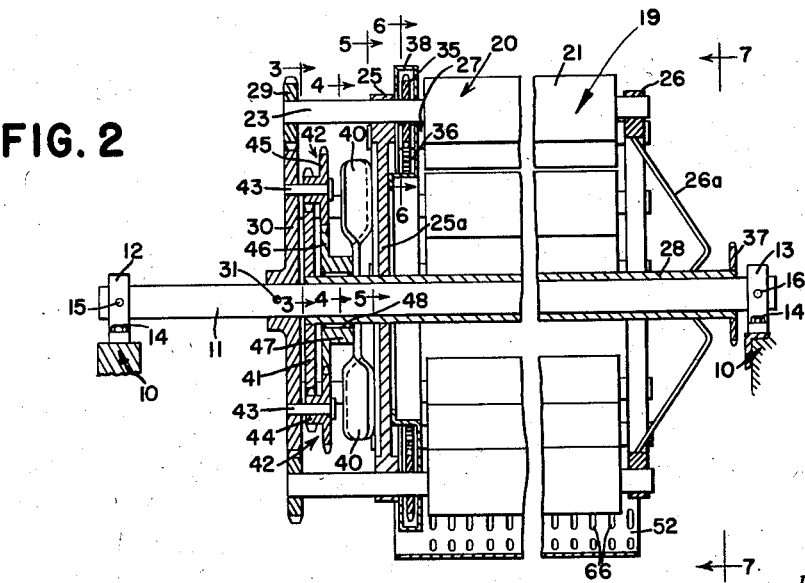
Fig. 2 is a sectional view taken along the lines 2—2 of Fig. 1.

Now with reference to the drawing, reference numeral 10 indicates a main frame. The main frame 10 may be either a stationary frame or a part of a corn harvester, it being unimportant for purposes of this invention. A main supporting shaft 11 is mounted on the main frame 10 by shaft supports 12 and 13 which are affixed to the main frame 10 by bolts 14. The shaft 11 is substantially horizontal and is fixed against rotation by set screws 15 and 16 which also lock the shaft against movement relative to the respective supports 12, 13.

A cylindrical structure 19 is composed of a plurality of pairs of cooperating husking rolls, each pair being indicated by the reference numeral 20 and forming between them a nip or pocket 20a (Fig. 7) for receiving ears of corn, and the individual rolls of the pairs being indicated by the reference numerals 21, and 22, respectively. Each pair 20 is equally radially spaced from the axis of the shaft 11 and are angularly spaced relative to the aforesaid axis. The husk rolls 21, 22 are of the usual conventional type and are fixed on husk rolls shafts 23, 24, respectively, which in turn are journalled in axially spaced annular rings 25 and 26 which support the rolls 21, 22 in substantially a horizontal position. Also serving as supporting framework are spoke like members 25a and 26a which extend radially from an elongated tubular drive shaft 28 to the annular rings 25 and 26, respectively, and serves to support the rings radially. The drive shaft 28 is mounted for rotation on the shaft 11 and extends substantially the length of the husking unit. The husk roll shafts 24 extend between the annular rings 25, 26 and are of sufficient length only to extend through the rings. The husk roll shafts 23 extend through the annular rings 25, 26 and extend axially beyond the ring 25 and have suitable spur gears 29 mounted on their ends which mesh with a fixed gear 30 which is concentric with and is fixed on the shaft 11 and held against rotation by means of a set screw 31. Fixed to each of the shafts 23 axially inwardly of the annular ring 26 is a pinion 35 which is in constant mesh with a gear 36 fixed to the shaft 24 of the adjacent husking roll 22.

A drive member 37 in the form of a sprocket is fixed to the tubular member 28 and is operative from an outside source to drive the member 28 rotatingly by about the shaft 11. An annular gear housing 38 is fixed to the ring 25 and covers the spur gears 35, 36. Other housing, while not shown, would normally be used for safety purposes and would surround the outer periphery of the husking cylinder.

Fan blades 40 are mounted for relative rotation on drive shaft or tubular member 28 at one end of the hucking mechanism. The fan blades are driven from the drive shaft 28 by means of a gear arrangement comprising a large spur gear 41 which is fixed to the tubular member 28 and a pair of gear clusters 42 spaced diametrically on opposite sides of the spur gear 41 and which are mounted on short stub shafts 43 which extend inwardly from the face of the fixed gear 30. Each of the gear clusters 42 is composed of a small gear 44 meshing with the enlarged spur gear 41 and a larger gear 45 which operates to drive a cooperating gear 46 having a hub 47 journaled, as at 48, on the outer surface of the drive shaft 28. The hub 47 of the gear 46 is fixed by suitable means to the fan blades 40. The object of the gear arrangement 41—46 is obviously to increase the speed of the fan blades as compared to the rate of rotation of the drive shaft 28.

Mounted on the frame 10 and beneath the cylindrical husking structure is a husking shoe 52. The husking shoe 52 has an axial length slightly longer than the axial length of the husking rolls 21, 22. It is of an arcuate shape having opposite edges 52c and 52d spaced angularly relative to the axis of rotation of the cylindrical structure. Extending from the opposite arcuately spaced edges 52c and 52d, are downwardly turned portions 52a and 52b. Fixed to the under surfaces of the turned down portions 52a and 52b are brackets 53 and 54. The brackets 53, 54 are provided with apertures 55, 56 respectively through which adjustment of the shoe 52 relative to the adjacent portion of the cylindrical structure may be made. The shoe 52 is supported from the frame 10 by means of vertically disposed rods 57, 58, which are formed at their upper ends to fit in the apertures 55 and 56. The rods 57, 58 are mounted on the frame 10 for vertical movement and bias the shoe 52 into its operative position by means of springs 59 and 60 surrounding the rods and held in position by means of pins 61 and 62. Suitable means, not shown, are provided to maintain stability of the shoe when in its adjusted position.

A feeding conveyor 65 is provided in conjunction with the husking mechanism and is of the underfed type operating to move material over the upper surface of the portion 52a of the husking shoe. The shoe 52 is provided with slots or perforations 66 which permit incidental kernals of corn separated from the ears in the husking operation to gravitate through the shoe to an inclined plate or conveyor 67 mounted under the shoe 52 and which operates to move the kernels to a suitable collecting unit. A housing, as indicated by reference numeral 68 (Fig. 7) encloses the lower portion of the assembly.

While the invention has so far been described in relation to a structure having husking rolls and an arcuate shoe disposed substantially in the horizontal, it should here be noted that this is not a necessary part of the invention. Any angular disposition of the rolls and shoe relative to the horizontal would operate satisfactorily as long as the positioning of the rolls and shoe were such as to permit a gravitational flow of kernels separated from the ears during the husking operation to pass through the perforated shoe.

The husking mechanism operates in the following manner. The feeding conveyor 65 moves the unhusked ears of corn upwardly along the plate portion 52a, there to be discharged at the intake end or edge 52c of the shoe 52 and between the shoe and the outside periphery of the husking cylinder. The sprocket 37 is driven by an outside power to cause rotation of the main drive means comprising the drive shaft 28 and the annular rings 25, 26, which are fixed to the tubular member 28, to move in a clockwise direction as viewed in Fig. 1. Thus, the pairs of husking rolls 20 will move in a clockwise direction, as indicated by the arrows A–1, about the axis of the shaft 11. Rotation of the cylindrical structure as a whole will operate the husk roll drive means and will create a clockwise rotation, as indicated by the arrow A–2 of the gears 29, and the husk roll shafts 23, which will operate through the spur gears 35, 36 to rotate the husk roll shafts 24 in a counterclockwise direction as indicated by the arrow A–3 (Fig. 6). The adjacent portions of the husk rolls 21, 22 will therefore move in a direction toward the center of the cylindrical structure.

It should here be noted that the axes of the husk roll shafts 23 are positioned from the axis of the shaft 11 a greater radial distance than the axis of the corresponding husk roll shaft 24. This serves the purpose of positioning the husk rolls 21 at a greater distance from the axis of rotation of the cylindrical structure than the husk rolls 22 and will operate to permit the ears of corn moving from the conveyor 65 to pass between the leading husk rolls 22 and the shoe 52 but not between the husk rolls 21 and the shoe 52 thereby being retained in the nips or pockets 20a of the husking rolls 21, 22. Each pair of husk rolls will therefore operate to convey or move the ears of corn along the upper surface of the shoe 52 to be discharged at the discharge edge 52d of the shoe.

As previously indicated the husks removed from the ears of corn will be driven internally of the cylindrical structure. The fan blades 40 driven at a high rate of speed from the drive shaft 28 and through its drive means, as indicated by the gear arrangement 41—47, will create a blast of air directed axially and internally of the cylindrical structure causing the husks to be blown through the opposite end of the cylindrical structure. Therefore, all operating portions of the husking unit, other than the conveying unit 65, are driven from a single outside power source operated from the sprocket 37.

While only one form of the invention has been shown, it should be recognized that other forms and variations can exist without departing basically from the broad general principle herein disclosed. It should therefore be understood that while the preferred embodiment of the invention has been described with the view of clearly and concisely illustrating the principles of the invention, it is desired not to so limit or narrow the invention beyond that which is claimed.

What is claimed is:

1. A corn-husking mechanism comprising: a main frame; an elongated supporting framework rotatably mounted on the main frame for movement about an axis of rotation; a structure of cylindrical form composed of a plurality of angularly disposed pairs of husking rolls mounted on the supporting framework, each pair being equally radially spaced relative to the axis; an arcuate and perforated shoe mounted on the frame under and proximate to the outer periphery of the cylindrical structure and having opposite edges spaced apart angularly relative to the axis; means delivering unhusked ears of corn to one edge of the shoe and between the shoe and the husking rolls; drive means mounted on the frame and operative to rotate the structure as a unit thereby driving the ears the arcuate length of the shoe to be discharged from the opposite edge, the drive means including husk roll drive means for rotating the rolls for removing husks from the ears as they move between the rolls and the shoe and to drive the husks radially inwardly of the cylindrical structure; and blower means mounted on the supporting framework directing a blast of air axially through the cylindrical structure to drive the husks out of the center portion of the structure.

2. The invention defined in claim 1 in which the shoe is biased into its normal operating position relative to the adjacent portion of the cylindrical structure, but is automatically adjustable to increase the space between the shoe and said portion upon an overload of corn or upon enlarged foreign matter entering the husking assembly.

3. The invention defined in claim 1, further characterized by a conveying means mounted under the arcuate shoe and adapted to receive incidental kernels of corn gravitating through the arcuate shoe as well as for receiving the husked ears of corn discharging from said opposite edge of the shoe.

4. A corn husking mechanism comprising: a main frame; an elongated supporting framework rotatably mounted on the main frame for movement about a horizontal axis; a structure of cylindrical form composed of a plurality of angularly disposed pairs of horizontal husking rolls mounted on the supporting framework, each pair being equally radially spaced relative to the axis; an arcuate shoe mounted on the frame under and proximate to the outer periphery of the cylindrical structure and having opposite edges spaced apart angularly relative to the axis; means delivering unhusked ears of corn to one edge of the shoe and between the shoe and the husking rolls; drive means mounted on the frame and operative to rotate the structure as a unit thereby driving the ears the arcuate length of the shoe to be discharged from its opposite edge, the drive means including husk roll drive means rotating the rolls for removing husks from the ears as they move between the rolls and the shoe and to drive the husks radially inwardly of the cylindrical structure; and blower means mounted on the supporting framework directing a blast of air axially through the cylindrical structure to drive the husks horizontally and out of the center of the structure.

5. A corn husking mechanism comprising: a main frame; an elongated supporting framework rotatably mounted on the main frame for movement about a horizontal axis; a structure of cylindrical form composed of a plurality of angularly disposed pairs of horizontal husking rolls mounted on the supporting framework, each pair being equally radially spaced relative to the axis and forming a pocket between them for receiving ears of corn; an arcuate and perforated shoe mounted on the frame under and proximate to the outer periphery of the cylindrical structure and having opposite edges spaced apart angularly relative to the axis; means delivering unhusked ears of corn to one edge of the shoe and between the shoe and the husking rolls for distribution in the pockets; drive means mounted on the frame and operative to rotate the structure as a unit thereby moving the ears the arcuate length of the shoe to be discharged from the opposite edge of the shoe, the drive means including husk roll drive means rotating the rolls for removing husks from the ears as they travel the length of the shoe and to drive the husks radially inwardly of the cylindrical structure; blower means mounted on the supporting framework directing a blast of air axially through the cylindrical structure to drive the husks horizontally and out of the center portion of the structure; and conveying means positioned under the shoe for receiving incidental kernels of corn gravitating through the perforations in the shoe and for receiving the husked ears of corn leaving said opposite edge of the shoe.

6. A corn husking mechanism comprising: a main frame; an elongated supporting framework rotatably mounted on the main frame for movement about a horizontal axis; a structure of cylindrical form composed of a plurality of angularly disposed pairs of horizontal husking rolls mounted on the supporting framework, each pair being equally radially spaced relative to the axis and forming a pocket between them for receiving ears of corn; an arcuate and perforated shoe mounted on the frame under and proximate to the outer periphery of the cylindrical structure and having opposite edges spaced apart angularly relative to the axis; means delivering unhusked ears of corn to one edge of the shoe and between the shoe and the husking rolls for distribution in the pockets; drive means mounted on the frame and operative to rotate the structure as a unit thereby moving the ears the arcuate length of the shoe to be discharged from the opposite edge of the shoe, the drive means including husk roll drive means for rotating the rolls for removing husks from the ears as they travel the length of the shoe and to drive the husks radially inwardly of the cylindrical structure; and conveying means positioned under the shoe for receiving incidental kernels of corn gravitating through the perforations in the shoe and for receiving the husked ears of corn leaving said opposite edge of the shoe.

7. A corn husking mechanism comprising: a main frame; an elongated supporting framework rotatably mounted on the main frame for movement about a horizontal axis; a structure of cylindrical form composed of a plurality of angularly disposed pairs of horizontal husking rolls mounted on the supporting framework, each pair being equally radially spaced relative to the axis and forming a pocket between them for receiving ears of corn; an arcuate shoe extending substantially the length of the rolls mounted on the frame under and proximate to the outer periphery of the cylindrical structure and having opposite edges spaced apart angularly relative to the axis; means delivering unhusked ears of corn to one edge of the shoe and between the shoe and the husking rolls for distribution in the pockets; blower means mounted on the supporting framework directing a blast of air axially and internally of the cylindrical structure; main drive means mounted on the frame and operative to rotate the structure as a unit thereby moving the ears the arcuate length of the shoe to be discharged from the opposite edge of the shoe; husk roll drive means operative upon rotation of the structure to rotate the rolls for removing husks from the ears as they move between the rolls and the shoe and to drive the husks radially inwardly of the cylindrical structure; and blower drive means responsive to operation of the main drive means to cause the blower means to drive the husks from the center of the cylindrical structure.

8. The invention defined in claim 7, in which the main drive means includes a central drive shaft rotatable about said axis of rotation, radially extending members fixed to the drive shaft, and means connecting the members to the husking rolls to cause the rolls to rotate about the axis of rotation in unison with the drive shaft; in which the husk roll drive means includes a fixed gear concentric with the drive shaft and each pair of husking rolls has at least one gear constantly in mesh with the fixed gear and operative upon rotation of the drive shaft to rotate the individual husking rolls about their axis; and the blower drive means includes a gear assembly operative from the drive shaft.

9. A corn husking mechanism comprising: a main frame; an elongated supporting framework rotatably mounted on the main frame for movement about a horizontal axis; a structure of cylindrical form composed of a plurality of angularly disposed pairs of horizontal husking rolls mounted on the supporting framework, each pair being equally radially spaced relative to the axis and forming an ear receiving pocket between the individual rolls of the pair, the leading husking roll relative to the direction of rotation being radially inwardly offset respective to the trailing husking roll; an arcuate shoe mounted on the frame under the outer periphery of the cylindrical structure and having opposite edges spaced apart angularly relative to the axis, the proximity of the shoe relative to the husking rolls being such that upon rotation of the cylindrical structure ears of corn may pass between the leading roll and the shoe but not the trailing roll and the shoe thereby being retained in the pocket of the respective pair of rolls; means delivering unhusked ears of corn to one edge of the shoe and between the shoe and the husking rolls; drive means mounted on the frame and operative to rotate the structure as a unit, thereby driving the ears the arcuate length of the shoe to be discharged from its opposite edge, the drive means including husk roll drive means for rotating the rolls to remove husks from the ears as they move between the cylindrical structure and the shoe, and to drive the husks internally of the cylindrical structure; and blower means mounted on the supporting framework directing a blast of air axially through the cylindrical structure to drive the husks horizontally and out of the center portion of the structure.

10. A corn husking mechanism comprising: a main frame; an elongated framework rotatably mounted on the main frame for movement about a horizontally disposed axis; husk roll means mounted on the framework spacedly from the axis of rotation; an arcuate shoe having opposite edges spaced angularly relative to the axis and mounted on the frame proximate to and under the orbit of rotation of the husk roll means, the shoe having openings therein for permitting kernels of corn to pass; means delivering unhusked ears of corn to one of said edges of the shoe and between the shoe and the husk roll means; drive means on the frame operative to rotate the framework and roll means as a unit and for moving ears of corn from said one edge of the shoe to the opposite edge, the drive means including means for operating said husk roll means for removing husks from the ears as they move between the husk roll means and the shoe.

11. The invention defined in claim 10, in which the husk roll means includes at least one pair of cooperating husking rolls forming an ear receiving pocket between them, and the leading roll relative to the direction of rotation of the framework is radially inwardly offset respective to the trailing husking roll, and the proximity of the shoe relative to the husking rolls is such that upon rotation of the framework and rolls as a unit ears of corn may pass between the leading roll and the shoe but not the trailing roll and the shoe thereby being retained in the pocket of the rolls.

12. The invention defined in claim 11, in which the husking rolls are driven in directions of rotation to cause the husks to move inwardly toward the axis.

13. The invention defined in claim 12, further characterized by blower means on the frame directing a blast of air between said axis and said rolls for driving the husks from the mechanism.

14. The invention defined in claim 10, further characterized by collecting means beneath the shoe for receiving the incidental kernels of corn passing through the openings.

15. The invention defined in claim 14, in which the collecting means is a conveyor positioned under the shoe for receiving kernels of corn passing through the openings and for receiving the ears of corn being discharged at said opposite edge of the shoe.

References Cited in the file of this patent
UNITED STATES PATENTS

| | | |
|---|---|---|
| 718,902 | Berry | Jan. 20, 1903 |
| 1,201,476 | Leister et al. | Oct. 17, 1916 |
| 1,407,057 | Fuhlrodt | Feb. 21, 1922 |
| 1,463,364 | Knapp | July 31, 1923 |